M. C. SCHWEINERT & H. P. KRAFT.
VACUUM VALVE.
APPLICATION FILED AUG. 21, 1915.
1,220,694.
Patented Mar. 27, 1917.
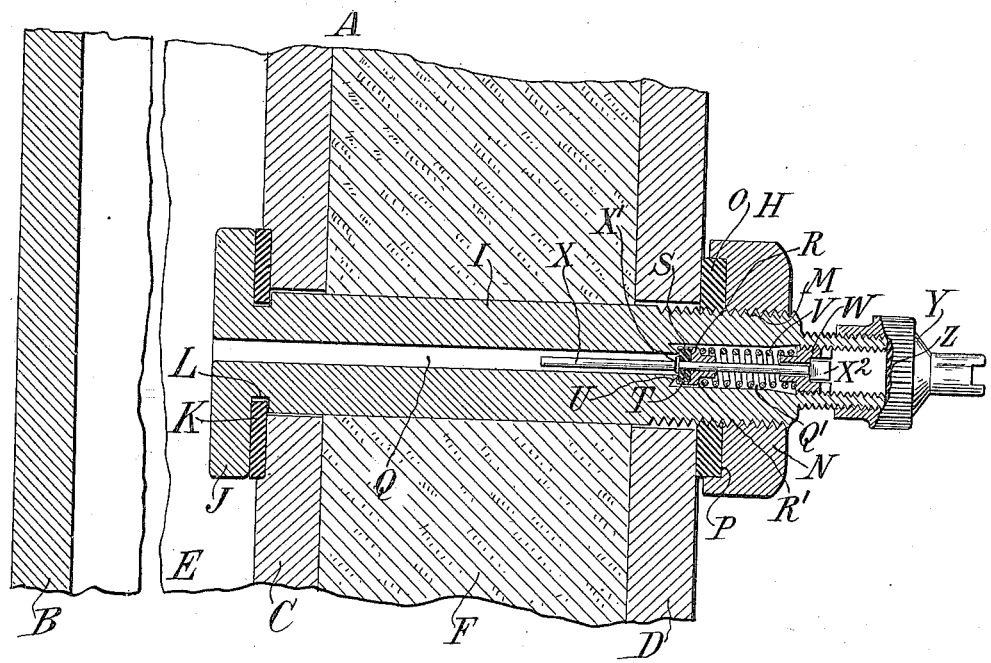
WITNESSES:
INVENTORS:
Maximilian Charles Schweinert,
and Henry P. Kraft,
By Attorneys,

UNITED STATES PATENT OFFICE.

MAXIMILIAN CHARLES SCHWEINERT, OF WEST HOBOKEN, AND HENRY P. KRAFT, OF RIDGEWOOD, NEW JERSEY.

VACUUM-VALVE.

1,220,694.      Specification of Letters Patent.      Patented Mar. 27, 1917.

Application filed August 21, 1915. Serial No. 46,640.

*To all whom it may concern:*

Be it known that we, MAXIMILIAN CHARLES SCHWEINERT, of West Hoboken, in the county of Hudson and State of New Jersey, and HENRY P. KRAFT, of Ridgewood, in the county of Bergen and State of New Jersey, both citizens of the United States of America, have invented certain new and useful Improvements in Vacuum-Valves, of which the following is a specification.

This invention relates to vacuum valves and aims to provide certain improvements therein.

The invention is particularly directed to valves for use in producing and maintaining vacuums in vessels or the like, being especially designed for use in refrigerators or other devices wherein it is desired to maintain a substantial vacuum in the walls thereof. The object of the invention is to provide a valve which is simple and cheap in construction, which can be secured in position without liability of leakage around it, and in which the valve member is easily accessible for inspection and repairs.

In the accompanying drawing we have illustrated the wall of the refrigerator provided with our improved valve, the latter being shown in diametrical section.

Referring to the drawing let A indicate a section of the refrigerator, which usually comprises three walls, B, C, D. Between the walls B and C is provided a space E from which the air is exhausted as much as is practicable in order to avoid as far as possible the transmission of heat from the exterior to the interior. Between the walls C and D there is also provided a space F which is filled or packed with heat insulating or non-conducting material in order to further minimize the transmission of heat. It is very desirable that the space E should be pumped out or exhausted from the exterior of the device, and for this reason it is necessary to extend the valve through the walls or partitions C and D and the intervening non-conducting material.

The valve provided by our improved invention is indicated as a whole by the letter H. It comprises a shell I which is preferably cylindrical, and which is formed at its inner end with a flange J adapted to compress a packing K against the wall C. The shell is also preferably formed with an annular groove L designed to receive the inner edge of the packing K. At its outer end the shell is screw-threaded, as shown at M, to receive a nut N which compresses a packing O against the exterior side of the wall D. Preferably the packing O is held in a recess P in the nut N, as shown. When the nut is screwed home both packings are compressed and leakage of air around the shell I is prevented.

The valve shell is formed with a bore or passage Q extending entirely through the shell, which passage is enlarged at $Q^1$ to form a valve chamber in which the valve proper operates. The latter, which is indicated by the reference letter R, preferably comprises a cylindrical member having a recess S within which is held a packing T, which is designed to co-act with a seat U formed as an integral part of the valve shell I. The valve is normally held on its seat by a spring V, the inner end of which contacts with a shoulder R' formed on the valve member, and the outer end of which bears against a follower W which is screw-threaded and adapted to engage a thread formed on the inner side of the valve shell.

According to the present invention the valve, spring and follower are connected by a stem X to which the valve R is fixed, the stem passing through the valve and the latter being swaged or soldered to the former. The valve stem X is also provided with a shoulder X' which serves to hold the packing T in place. The inner end of the stem X is preferably extended into the bore Q and serves as a guide when the valve is lifted. The outer end of the stem is projected through the follower W and provided with a head $X^2$ which prevents the removal of the follower from the stem and thereby couples together the various parts of the valve proper. The stem fits loosely through the follower so as to admit air to be drawn therethrough, but also constitutes a second guide for the valve. The cap Y is preferably used at the outer end of the shell, the cap carrying a packing Z which contacts with the end of the shell and thus insures against leakage of the exterior air into the valve.

It will be observed that the follower requires no packing since the valve proper seats upon an integral part of the shell, the function of the follower being to hold the valve, spring and parts in place and to assist in removing the various parts so that the latter can be easily inspected, repaired or replaced. For this purpose the follower is provided with projections or other screwdriver provisions, which in the construction shown are adapted to be engaged by the slotted end of the cap. Other equivalent means may be employed.

The construction provided by this invention is simple, compact and economical to manufacture. The valve parts can be removed easily and quickly and as easily replaced. There is no danger of loss since all of the working parts are connected together.

In operation an ordinary vacuum pump is screwed on to the projecting shell, the cap being temporarily removed. When the pumping operation is completed the cap is replaced.

While we have shown and described one form of the invention, it is also understood that we do not wish to be limited thereto as various changes can be made therein without departing from the invention.

What we claim is:—

1. A vacuum valve comprising a shell having a flange on its inner end, said shell being screw-threaded at its outer end and provided with a nut near said end, and packing members compressed by said flange and nut.

2. A vacuum valve comprising a shell and an integral seat in said shell, a valve proper co-acting with said seat, and a follower outwardly of said seat, said shell having means at its outer end for connection with an exhausting device.

3. A vacuum valve comprising a shell and an integral seat in said shell, a valve proper co-acting with said seat, a follower outwardly of said seat, and a spring between said valve proper and said follower, said shell having means at its outer end for connection with an exhausting device.

4. A vacuum valve comprising a shell and an integral seat in said shell, a valve proper co-acting with said seat, a follower outwardly of said seat, a spring between said valve proper and follower, and a stem to which said valve proper is attached, said stem passing through said follower and connecting said follower and spring to said valve proper, said shell having means at its outer end for connection with an exhausting device.

5. A vacuum valve comprising a shell and an integral seat in said shell, a valve proper co-acting with said seat, a follower outwardly of said seat, a spring between said valve proper and follower, and a stem to which said valve proper is attached, said stem passing through said follower and connecting said follower and spring to said valve proper, and said stem having an inwardly projecting portion constituting a guide for the valve.

6. A vacuum valve comprising a casing I having a flange J and nut N, said casing having a valve seat T and a valve member within said casing, a follower screwing into said casing, a spring between said valve follower and valve, and a stem fixed to said valve and passing through said follower and having a head to prevent separation of said follower, spring and valve.

7. A vacuum valve comprising a shell, a seat in said shell, a valve proper acting with said seat and opening toward the outer end of the shell, and a follower outwardly of said seat, said shell having an integral portion at its outer end for connection with an exhaust pump or the like.

In witness whereof, we have hereunto signed our names in the presence of two subscribing witnesses.

MAXIMILIAN CHARLES SCHWEINERT.
HENRY P. KRAFT.

Witnesses:
GRACE GUNDERMAN,
FRED WHITE.

Copies of this patent may be obtained for five cents each, by addressing the "Commissioner of Patents, Washington, D. C."